United States Patent Office 3,075,025
Patented Jan. 22, 1963

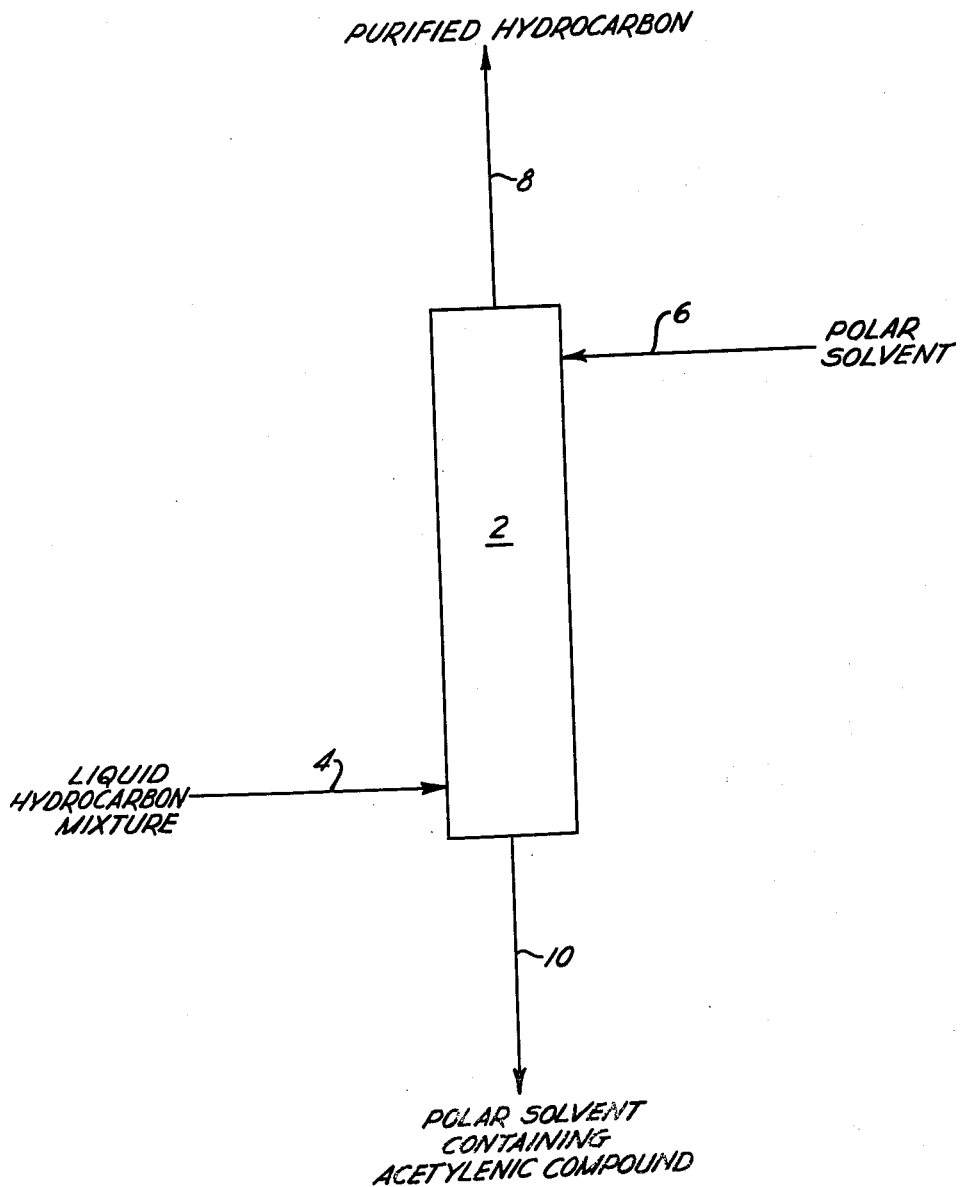

3,075,025
PROCESS FOR SEPARATING ACETYLENIC COMPOUNDS FROM AN ISOPRENE MIXTURE
Alfred M. Henke, Springdale, and Bernard J. Lerner, Pittsburgh, Pa., assignors to Gulf Research & Development Company, Pittsburgh, Pa., a corporation of Delaware
Filed Dec. 17, 1959, Ser. No. 860,287
4 Claims. (Cl. 260—681.5)

This invention relates to a process for purifying a hydrocarbon mixture and more particularly to a process for purifying a liquid hydrocarbon mixture of its acetylenic impurities. By "liquid hydrocarbon mixture" we mean to include hydrocarbon mixtures which can be liquid under the purification conditions hereinafter described.

Many hydrocarbons which can be liquid under the purification conditions of this invention contain acetylenic compounds in admixture therewith. Hydrocarbons which fall in this category include paraffins such as propane, decane and eicosane; olefins such as propylene, 2-methyl-1-octene and 1-octadecene; diolefins such as isoprene, 2-methyl-1,7-octadiene and 1,4-tetradecadiene; triolefins such as 1,3,5-hexatriene, 5-methyl-1,3,5-octatriene and 2,6-dimethyl-1,8,10-undecatriene; aromatics such as benzene, isopropylbenzene, styrene, phenyl hexenes and 5-phenyl-1,2-pentadiene; cycloparaffins such as cyclopropanes, cyclohexanes, ethyl cyclopentane, 1-methyl-3-ethylcyclopentane, 3-cyclopropyl-2-pentene, 1-cyclohexyl-2,3-pentadiene; cycloolefins such as cyclopentene, 1-amyl-2-methyl-1-cyclohexene and 1-vinyl-1-cyclopentene; cyclodiolefins such as 1,2-cycloheptadiene and 5-isopropyldiene-1,3-cyclopentadiene; cyclotriolefins such as 1,3,5-cycloheptatriene; dicyclic hydrocarbons such as bicyclohexane and phenyl cyclopentene; etc. The acetylenic compounds admixed therewith, which can be from about 0.01 to about 10.0 percent by weight of the total hydrocarbon mixture, are often undesirable and must be separated from such mixture in order to render the hydrocarbon commercially attractive. Acetylenic compounds which are so found include straight chain acetylenes such as acetylene, methylacetylene, 2-butyne and 1-hexadecyne; branched acetylenes such as 3-methyl-1-butyne, 4,4-dimethyl-1-pentyne and 3,3-dimethyl-4-nonyne; diacetylenes such as 1,3-butadiyne, 2,7-dimethyl-3,5-octadiyne and 1,19-eicosadiyne; olefin acetylenes such as 3-buten-1-yne, 3-ethyl-3-penten-1-yne and 1-dodecen-3-yne; diolefin acetylenes such as 1,3-hexadien-5-yne and 3,6-diethyl-2,6-octadien-4-yne; aromatic acetylenes such as phenylacetylene and 4-phenyl-1-butyne; cycloparaffin acetylenes such as cyclopentyl acetylene, 1-cyclohexyl-1-propyne and 6-cyclohexyl-1-hexyne, etc.

We have found that a liquid hydrocarbon mixture containing acetylenic compounds can be treated to separate and remove said acetylenic compounds therefrom by extracting such mixture with an aqueous solution of a selected polar solvent.

Any polar solvent having a solubility in water of at least about 1/100 part by weight and preferably about three to about 50 parts by weight, per part by weight of water at the reaction conditions can be employed. Thus any of the following polar solvents can be employed: aldehydes such as 2-furaldehyde, 5-methyl-2-furaldehyde, 2,4,6-trimethyl-1,3,5-trioxane and propionaldehyde; alcohols such as ethanol, ethylene glycol, phenol, cresol, furfural alcohol; nitriles such as acetonitrile, acronitrile, butyronitrile; nitrocompounds such as nitromethane, 1-nitrosopiperidine and nitroethane; amines such as aniline, phenyl hydrazine, ethylenediamine and furfuryl amine; esters such as butyl acetate, ethyl acetate and methyl carbonate; ethers such as diethyl ether, acetate and monoethyl ether; halides such as dichloroethyl ethyl ether, trichloroacetaldehyde and chloroisopropyl alcohols; ketones such as acetone, 2,4-pentanedione and chloropropanol; amides such as dialkyl amides, for example, dimethylformamide and diethylformamide; sulfides such as dimethylsulfoxide and dimethylsulfolane; nitrogen hetrocyclics such as pyridine, quinoline and pyrroline; etc. Dimethyl formamide is a particularly effective polar solvent for such purpose. In accordance with the specific conditions of this process the polar solvent can not be used alone. It must be used in the form of an aqueous solution wherein the polar solvent represents about one to about 70, preferably about three to about 50, percent by weight of the aqueous solution.

The pressure and temperature conditions required for extraction are not critical and preferably should be such as to maintain the contents of the extraction chamber in two liquid phases. Thus a pressure of about 0 to about 600 pounds per square inch gauge and a temperature of about 32° to about 200° F. can be employed.

The extraction procedure can be continuous or multi-stage. Total amount of aqueous polar solvent employed can vary over a wide range but is preferably about 0.1 to about 4.0 parts by weight relative to the hydrocarbon mixture being treated. The contact time is not critical, but is in general at least about two minutes, but preferably about five to about 30 minutes.

The accompanying drawing illustrates diagrammatically the procedure employed in the practice of this invention. The liquid hydrocarbon mixture to be purified is introduced adjacent the base of column 2 by line 4. The polar solvent in aqueous form is introduced adjacent the top of column 2 by line 6. Two phases are thus present in column 2: the liquid hydrocarbon phase to be purified and the aqueous phase containing the polar solvent. If polar solvent alone were introduced into column 2 by line 6 and not in aqueous form, there would be but one phase in the column and no purification would result.

The aqueous phase containing the polar solvent moves downwardly through column 2 and removes from the hydrocarbon phase the acetylenic compounds admixed therewith. The resultant hydrocarbon separated from the acetylenic compounds is removed from the top of column 2 by line 8. The hydrocarbon so removed, being thus purified, can be used immediately without further treatment. In some cases wherein a particularly dry product is desired, it may be further treated for such purpose in any suitable manner. The aqueous phase containing the polar solvent, together wtih the acetylenic compounds removed from the hydrocarbon mixture, is removed from the base of column 2 by line 10. If desired the polar solvent can be regenerated by distillation or steam stripping to remove acetylenic compounds therefrom.

The process of the present invention is further illustrated below.

*Example I*

One hundred cubic centimeters of an impure isoprene mixture containing, in mol percent, 98.5 percent isoprene, 0.1 percent 2-methyl-2-butene and 1.4 percent 2-butyne was extracted in a single stage over a period of about 30 minutes with 100 cubic centimeters of an aqueous solution containing 5 volume percent of dimethyl formamide at a temperature of 32° F. The raffinate, or purified hydrocarbon layer, was found to contain, in mol percent, 98.8 percent isoprene, 0.2 percent 2-methyl-2-butene and 1.0 percent 2-butyne. Thus in only one contact stage the reduction in acetylenic compounds amounted to about 28 percent. In order further to reduce the acetylenic compounds present additional contact stages can of course be employed.

Example II

That an aqueous solution of the defined polar solvent must be employed in accordance with the conditions herein described is apparent from the following. To 100 cubic centimeters of an impure isoprene mixture of the same composition as that employed in Example I there was added 100 cubic centimeters of dimethyl formamide. The resulting mixture was maintained at 32° F. for 20 minutes, then agitated and thereafter permitted to remain at such temperature for an additional 15 minutes. Only one phase was present and therefore no purification was effected.

Obviously many modifications and variations of the invention, as hereinabove set forth, can be made without departing from the spirit and scope thereof, and therefore only such limitations should be imposed as are indicated in the appended claims.

We claim:

1. A process for separating acetylenic compounds from an isoprene mixture containing the same which comprises extracting said mixture with an aqueous solution of a dialkyl formamide in a liquid phase operation.

2. A process for separating acetylenic compounds from an isoprene mixture containing the same which comprises extracting said mixture with an aqueous solution of dimethyl formamide in a liquid phase operation.

3. A process for separating 2-butyne from an isoprene mixture which comprises extracting said mixture with an aqueous solution of a dialkyl formamide in a liquid phase operation.

4. A process for separating 2-butyne from an isoprene mixture which comprises extracting said mixture with an aqueous solution of dimethyl formamide in a liquid phase operation.

References Cited in the file of this patent

UNITED STATES PATENTS

| | | |
|---|---|---|
| 2,146,448 | Scott et al. | Feb. 7, 1939 |
| 2,523,681 | Cole | Sept. 26, 1950 |
| 2,690,417 | Shalit et al. | Sept. 28, 1954 |
| 2,715,947 | Alexander | Aug. 23, 1955 |
| 2,719,601 | Bartholome et al. | Oct. 4, 1955 |
| 2,908,731 | Koble | Oct. 13, 1959 |
| 2,935,540 | Wolfe | May 3, 1960 |
| 2,961,473 | Ray et al. | Nov. 22, 1960 |
| 2,982,796 | Veal | May 2, 1961 |

FOREIGN PATENTS

| | | |
|---|---|---|
| 548,734 | Great Britain | Oct. 22, 1942 |